(No Model.) 9 Sheets—Sheet 1.

F. R. KEYES & C. A. BAKER.
CIGAR BUNCH ROLLING MACHINE.

No. 571,375. Patented Nov. 17, 1896.

WITNESSES:
Charles W. Morvin.
Jessie C. Murray

INVENTORS
Frank R. Keyes
Chas. A. Baker
BY Smith & Denison
ATTORNEYS.

(No Model.) 9 Sheets—Sheet 4.

F. R. KEYES & C. A. BAKER.
CIGAR BUNCH ROLLING MACHINE.

No. 571,375. Patented Nov. 17, 1896.

WITNESSES:
Charles W. Marvin.
Jessie E. Murray

INVENTORS
Frank R. Keyes
Chas. A. Baker
BY
Smith & Benson
ATTORNEYS.

(No Model.) 9 Sheets—Sheet 5.

F. R. KEYES & C. A. BAKER.
CIGAR BUNCH ROLLING MACHINE.

No. 571,375. Patented Nov. 17, 1896.

WITNESSES:
Charles W. Marvin
Jessie E. Murray

INVENTORS
Frank R. Keyes
Chas. A. Baker
BY
Smith & Benson
ATTORNEYS.

THE NORRIS PETERS CO., PHOTO-LITHO., WASHINGTON, D. C.

(No Model.) 9 Sheets—Sheet 6.

F. R. KEYES & C. A. BAKER.
CIGAR BUNCH ROLLING MACHINE.

No. 571,375. Patented Nov. 17, 1896.

WITNESSES:
Charles W. Morvin
Jessie O. Murray

INVENTORS
Frank R. Keyes
Chas. A. Baker
BY
Smith & Armson
ATTORNEYS.

(No Model.) 9 Sheets—Sheet 7.

F. R. KEYES & C. A. BAKER.
CIGAR BUNCH ROLLING MACHINE.

No. 571,375. Patented Nov. 17, 1896.

WITNESSES:
Charles W. Marvin
Jessie E. Murray

INVENTORS
Frank R. Keyes
Chas. A. Baker
BY
Smith & Stimson
ATTORNEYS.

(No Model.) 9 Sheets—Sheet 8.

F. R. KEYES & C. A. BAKER.
CIGAR BUNCH ROLLING MACHINE.

No. 571,375. Patented Nov. 17, 1896.

WITNESSES:
Charles. W. Marvin.
Jessie E. Murray INVENTORS
Frank R. Keyes
Chas. A. Baker
BY
Smith & Emason
ATTORNEYS.

(No Model.) 9 Sheets—Sheet 9.

F. R. KEYES & C. A. BAKER.
CIGAR BUNCH ROLLING MACHINE.

No. 571,375. Patented Nov. 17, 1896.

WITNESSES:
Charles W. Morvin
Jessie E. Murray

INVENTOR
Frank R. Keyes
Charles A. Baker
BY
Smith & Armson
ATTORNEYS.

United States Patent Office.

FRANK R. KEYES AND CHARLES A. BAKER, OF BINGHAMTON, NEW YORK.

CIGAR-BUNCH-ROLLING MACHINE.

SPECIFICATION forming part of Letters Patent No. 571,375, dated November 17, 1896.

Application filed March 29, 1895. Serial No. 543,297. (No model.) Patented in England March 5, 1895, No. 4,700.

*To all whom it may concern:*

Be it known that we, FRANK R. KEYES and CHARLES A. BAKER, of Binghamton, in the county of Broome, in the State of New York, have invented new and useful Improvements in Cigar-Bunch-Rolling Machines, of which the following, taken in connection with the accompanying drawings, is a full, clear, and exact description.

The mechanisms shown and described herein are a part of those shown and described in a British patent issued to us, dated March 5, 1895, No. 4,700.

Our invention relates to machines for making cigars, and particularly to those used for rolling bunches into wrappers, such as is shown and described in the patent issued to John Bunn, F. R. Keyes, and C. A. Baker March 5, 1895, No. 535,048.

Our object is to produce a machine embodying a traversing or reciprocating table and a stationary wrapper-support contiguous thereto; in which the bunch-rolling chamber in said table comprises an endless apron upon and driven by rollers constituting the bottom, a rearward roller constituting the back thereof, a presser-roller vertically movable above the apron and in front of the back roller, and a wrapper-stretcher, the inner edge of which constitutes the front wall, all journaled in or mounted upon said table, and suitable means being provided to operate the said several rollers and to adjust said stretcher to vary the width of said chamber; in which the wrapper is placed upon its support, with its tuck end under the bunch and held in contact therewith by a finger, the bunch being retained in position by the walls of said chamber while being rotated by said apron; in which as the bunch is rolled into the wrapper, and just before the tip is finished, the wrapper is nicked, so as to form the lap for the head of the tip and parted to secure it, all while in said chamber; in which the stretcher has a laterally and longitudinally convex upper face, and is provided at one end with a tip-concavity, the front edge of which is a curved extension of said inner edge, so that the wrapper is drawn over said convexity and stretched smooth by the rotation of the bunch and the movement of the table, suitable means being provided to reverse said table.

Our invention consists in the several novel features of construction and operation hereinafter described and which are specifically set forth in the claims hereunto annexed. It is constructed as follows, reference being had to the accompanying drawings, in which—

A is the bed of the machine, carrying standards 3 4, the drive-shaft 5 being journaled in a bracket 6 on the standard 3, and 7 is a drive-gear on said shaft meshing with the pinions 8 upon the auxiliary shafts 9, said shafts being driven by the drive-pulley 10, 11 being an ordinary clutch operated by the lever 12 in any ordinary way to shift the clutch to stop or start the machine.

Rollers 13 are splined onto the shafts 9 and adapted to traverse them and carry and drive the endless apron 14. Vertical bars $m$ are loosely mounted upon the shafts 9 and adapted to slide thereon, being also connected at the bottom, and 15 is a table mounted upon said bars.

A shaft 16 is journaled in bearings in an upright 16' upon the rear of the table. 17 is a sleeve adjustable on said shaft by a set-screw $n$.

18 is a boss upon the sleeve; 19, an arm on said boss, to which a cord 20 is attached, running down to an ordinary foot-treadle, (not shown,) by which said arm is pulled down and said shaft and sleeve rocked. In said boss a stem 21 is adjustably secured by a set-screw $n'$. 22 is a sleeve on said stem, 23 is a rod adjustable in said sleeve, and 23' are arms upon said rod, all constituting the presser-frame, and 24 is a presser-roller journaled in said arms. The lower ends of the bars $m$ are connected by the bar 25, provided with a longitudinal slot 26, having teeth on its sides, creating the rack-bars 27 28, each having a blank space 29 at its end.

A shifting bar 30 is pivoted upon the base at 31, carrying a post 32, in which a shaft 33 is journaled and in a bracket 34. 35 is a bevel-gear on said shaft, and 36 is a spur-gear also therein, adapted to engage with the racks of the double rack-bar 25.

A pinion on one of the shafts 9 meshes with a train of gears 38 on a shaft 39 and an intermediate shaft in the standard 3, both being journaled in a bracket 41 upon the bar 30, said shaft having a universal joint 40 and provided with a bevel-gear 42, meshing with the gear 35 to drive the gear 36 and drive said rack-bar, a cross-spring holding it in engagement with one rack, and thereby propel the table forward until the gear reaches the blank space in the rack, when the table stops, though said gear continues its rotation. To reverse the table, strain is applied to the cord 43 to swing the shifter 30 and bring the gear 36 into mesh with the other rack and returns the table, which stops as before at the end of that rack, and when said strain is removed a spring-rack engaging with the lever 44, to which the cord is connected, throws said shifter back, bringing said gear into engagement with first rack, said lever being pivoted upon a post 45 under the bed and having an arm 46 projecting up through a slot in the bed to engage with said shifter. The wrapper-support 47, comprising a plate and a stem, is mounted in a standard 48 upon the bed adjustably by means of a set-screw. (Shown.) Upon the rear shaft 9 a gear 49 is mounted, engaging with the pinion 50, which engages with a gear 51 upon a shaft 52, journaled in one of said bars $m$ and carrying a roller 53 contiguous to the apron.

Figures 22, 23, 24, 25, 26, 27, 28, 29, 30:
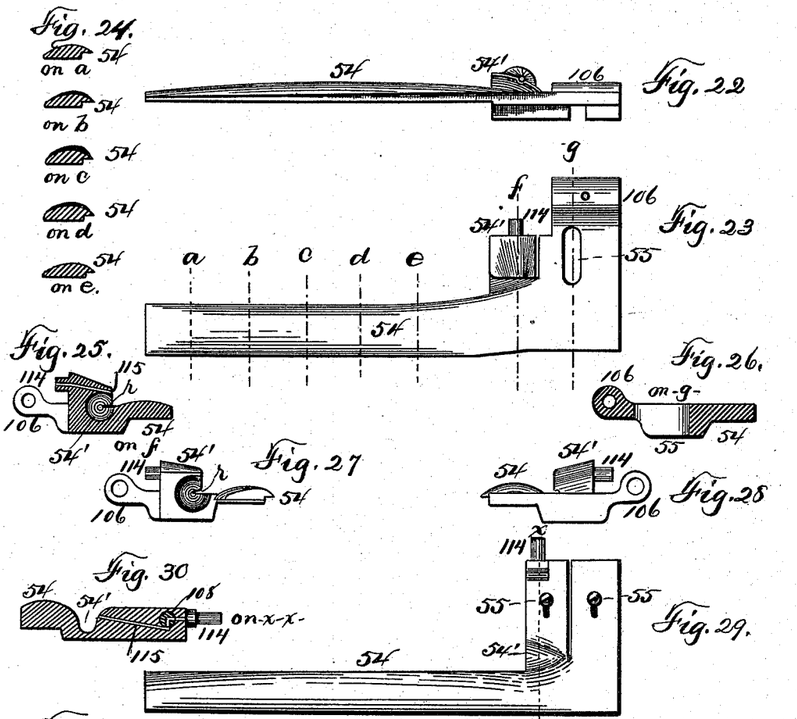
Fig. 22 is a front elevation of the wrapper-stretcher.
Fig. 23 is a top plan thereof.
Fig. 24 shows transverse sections of the wrapper-stretcher upon the dotted lines marked $a$, $b$, $c$, $d$, and $e$, respectively.
Fig. 25 is a transverse section thereof on line $f$.
Fig. 26 is a like view thereof on line $g$.
Fig. 27 is an end elevation of the stretcher, looking at it from the left in Fig. 23.
Fig. 28 is a like view looking at it from the right.
Fig. 29 is a top plan of a stretcher having a straight inner edge.
Fig. 30 is a section thereof on line $x$ $x$, showing the paste-conduit and valve therein.

Upon the table a stretcher 54 is mounted, Figs. 23 to 29, comprising a convex metallic plate and having a tip-concavity 54' to receive the tip of a bunch or cigar partly open on the front and provided with a slit $r$, and adjustable forward or back by means of the slot and bolt 55 through it into the table. The inner edge of said stretcher is either curved, as shown in Fig. 23, or straight, as shown in Fig. 29.

Figures 31, 32:
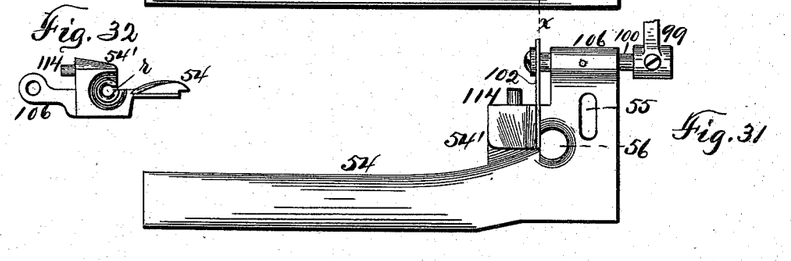
Fig. 31 is a top plan of a stretcher adapted to be used in making cheroots.
Fig. 32 is an end elevation of the same.

In Figs. 31 and 32 a stretcher is shown in which the tip-concavity is adapted to the making of blunt-tipped cheroots, having an open throat through which the tip of the bunch protrudes, so that after the wrapper is applied thereto the knife 102 will cut off the protruding end and leave it blunt, and 56 is a hole through the stretcher, through which the tip-trimmings fall into a suitable receptacle.

Figure 5:
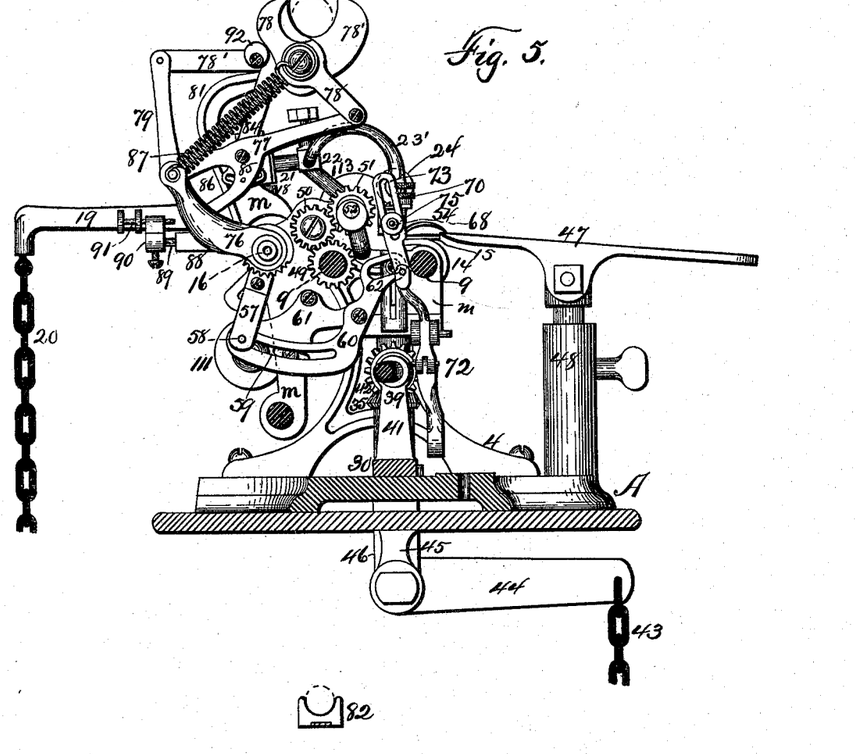
Fig. 5 is a vertical transverse sectional elevation on line M M in Fig. 3.
Figure 6:
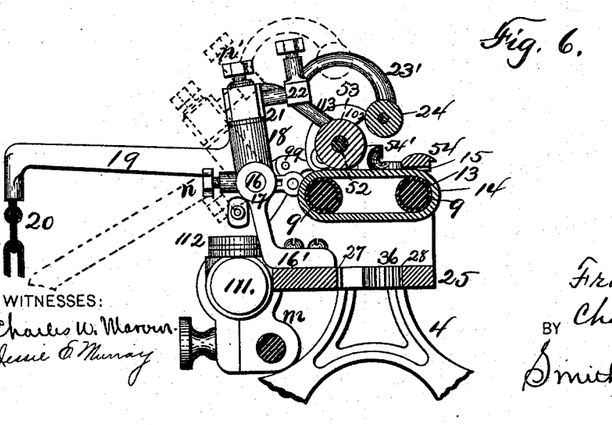
Fig. 6 is a vertical sectional elevation on a line transverse to the bunch-chamber and its rollers, apron, and stretcher.
Figures 7, 9, 10:
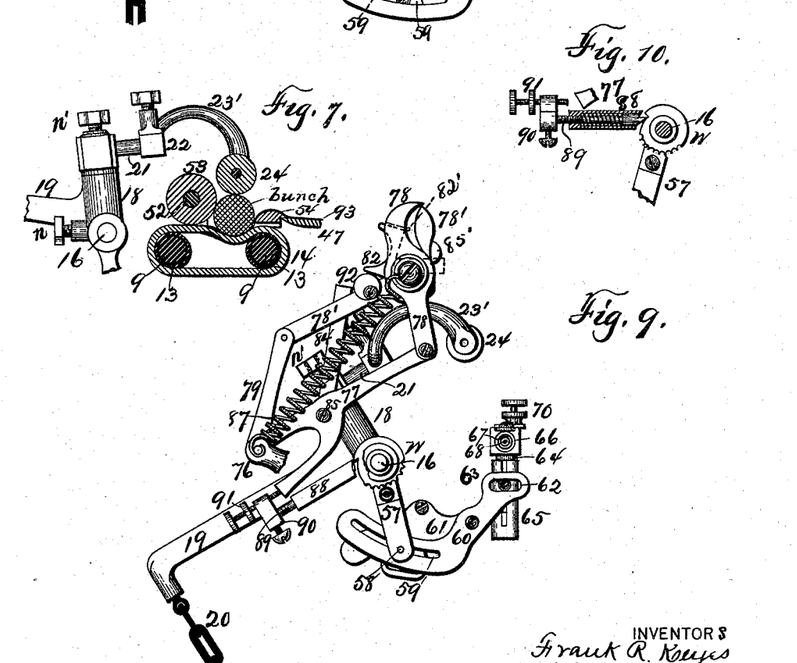
Fig. 7 is a sectional detail of the bunch-chamber, rollers, apron, stretcher, and presser-roller frame and showing a bunch in said chamber being rolled into a wrapper.
Fig. 9 is a like view of the same parts, showing the presser-roller raised, the tuck-cutter shut, as in cutting of a tuck, the trough tilted, and the finger depressed.
Fig. 10 is a sectional detail of the trip mechanism by which the tilting trough is tripped to be returned to an upright position when rocked to the position shown in Fig. 9.
Figure 8:
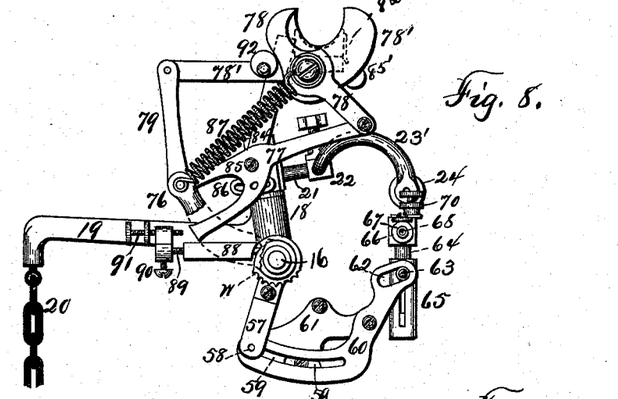
Fig. 8 is an elevation of the presser-roller mechanism and the tuck-cutter mechanism, the trough-tilting mechanism, and the mechanism for vertically reciprocating the wrapper-finger.
Figure 18:
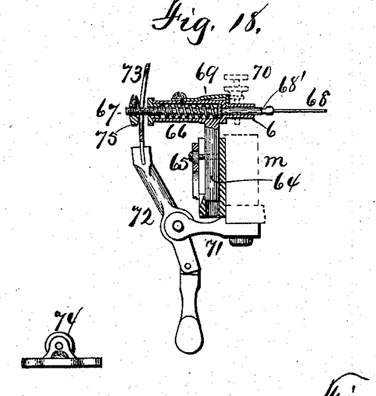
Fig. 18 is a vertical sectional elevation of the same.
Figure 19:
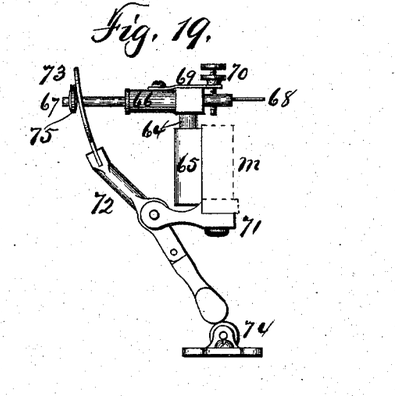
Fig. 19 is the front elevation of the same, showing the finger retracted.
Figure 20:
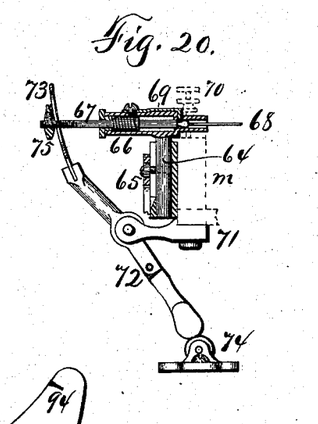
Fig. 20 is a vertical sectional elevation of Fig. 19.
Figure 21:
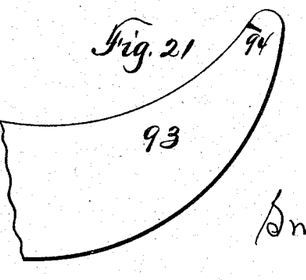
Fig. 21 is a plan of part of a wrapper, showing the tip end nicked to form the head upon the tip of the cigar.

Upon the shaft 16, Figs. 5, 8, and 9, an arm 57 is secured, provided with a pin 58, engaging with a cam-slot 59 in the lever 60, pivoted upon a plate 61, adjustably mounted upon the bar $m$, said lever having a slot 62, through which the pin 63 is inserted and connected to the stem 64, vertically movable in the socket 65, secured upon the bar $m$, and 6 is a hollow sleeve upon said stem, Figs. 17 to 20, through which the tubular slide 67 reciprocates, and 68 is a finger (wire) passed through said slide and secured therein in any ordinary way. This slide is provided with a neck 68', and 69 is a spring-catch adapted to engage with said neck when said slide is drawn back, as in Fig. 20, and hold the finger back. When the shaft 16 is rocked, the arm 57 actuates the lever 60 to depress the finger, the parts in this position being shown in Fig. 9, and when released the parts return to their normal positions, as shown in Fig. 8. When so depressed, the adjustable trip 70, inserted through the catch, engages with the bar $m$ to raise the point of the catch out of engagement with said neck and permit the spring around said sleeve to project it and the finger, as shown in Fig. 18. An arm 71, secured on said bar $m$ and a sectional lever 72, is pivoted therein, and 73 is a vertically-slotted plate mounted in said lever and fitting over said sleeve, and as the table is carried to the left said lever engages with an adjustable stop 74 upon the bed and is swung, as shown in Figs. 19 and 20, whereby said sleeve and needle are retracted at any time after two or more winds are made, 75 being a nut upon said sleeve, adjustable to regulate the movements of said finger, both outward to engage with the wrapper and hold it against the bunch until one or two winds are completed upon the tuck and backward to withdraw it from under the wind or winds. Then the shaft 16 is rocked to raise the presser-roller, the cigar is removed from the rolling-chamber, the finger is released and thrown forward, the lever 72 having passed the stop, another wrapper is placed upon the support with its end over the finger, a new bunch is inserted, and when the presser-roller is lowered onto it the arm 57 and lever 60 raise the finger-holder, Fig. 8, and thereby grip the wrapper against the bunch. An arm 76 is loosely mounted on the shaft 16, Fig. 8, a forked bar 77 has one branch connected to said arm, and 78 is one member of a tuck-cutter connected to said bar. A link 79 connects said bar to the other member 78' of the tuck-cutter, and both members are pivoted upon the end of a block 80, which is carried by a bracket 81, erected upon the double rack-bar plate. A cigar-holder 82, provided with a head 83, adjustable according to the length of the cigar by shifting the rod carrying it, is mounted upon said block by a hinge-joint, so as to rock thereon and tilt backward, and normally held in an upright position by a rod 84, pivoted upon a pin 85 upon the bar 77 and adjustable by means of a slot-and-bolt fastening 86, said holder being adapted to tilt when the tuck-cutting blade 78' is operated by the engagement of the roller 85' with the lug 82' in said trough. A spring 87, connected to the arm 76 and to the block 80, is brought under tension by the rocking of said arm to close the tuck-cutting blades. A tube 88 is secured onto the arm 76. A sliding pawl 89 is mounted therein, Fig. 10, with the usual spring. A block 90 is secured on said pawl. A set-screw 91 is adjustably mounted in said block. The point of the pawl engages with a ratchet $w$ upon the shaft 16, and when the shaft is rocked to operate the tuck-cutting blades like scissors to cut the tuck the lower branch of the bar 77 engages with said set-screw and forces said pawl backward, releasing it from the ratchet, and then the spring 87 throws the arm 76, bar 77, and tuck-cutting blades back to the position shown in Fig. 8, the other parts remaining in the positions shown in Fig. 9, with the presser-roller raised and the wrapper-finger depressed. A stop 92 regulates the opening of said blades. When said arm is depressed and the tuck is cut, the cigar-holder tilts back, as shown by the dotted lines in Fig. 9, and when the spring 87 restores the parts the rod 84 reëngages with and returns said holder to its normal position. (See dotted lines, Fig. 8.)

Figure 4:
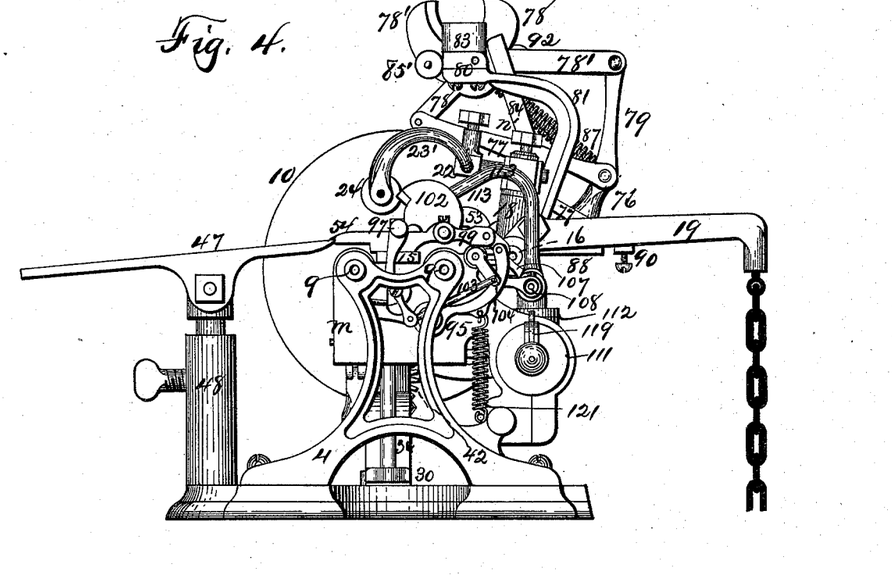
Fig. 4 is an end elevation thereof.
Figure 11:
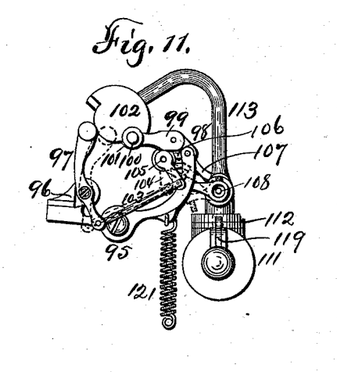
Fig. 11 is a detail of the mechanism for operating the paster when the handle is pushed back, as shown by the dotted lines, to open the valve in the pipe connected to the reservoir.
Figure 12:
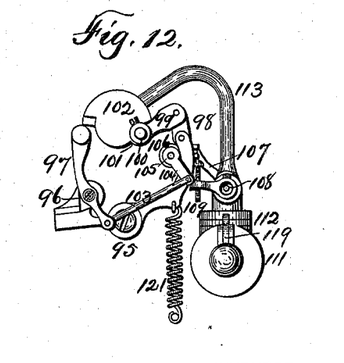
Fig. 12 is an end elevation of the same, showing the handle drawn forward to operate the nicking-knife.

In Figs. 4, 11, and 12 the wrapper-nicking mechanism and pasting mechanism are shown. The nicking mechanism is designed to cut the edge of the wrapper 93, as at 94, in order to properly form the head, when it is rolled around the tip of the bunch.

Figure 1:
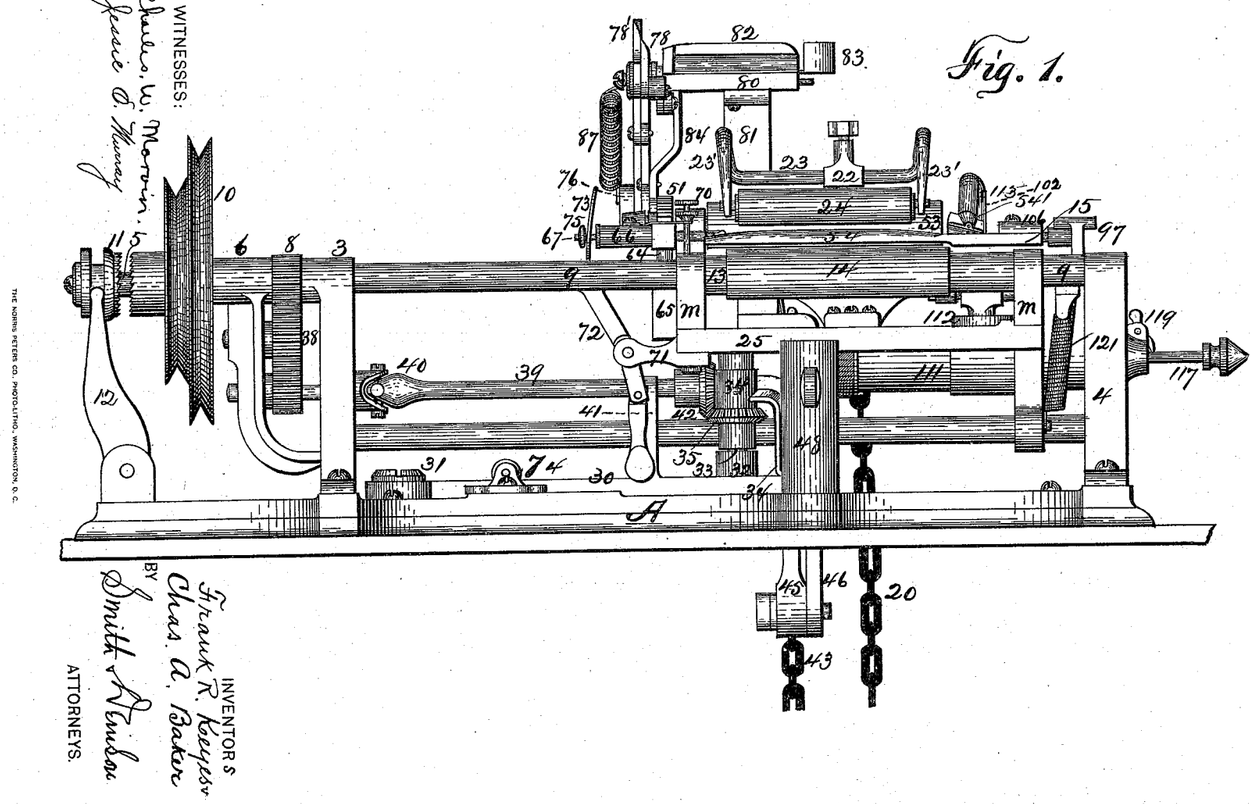
Figure 1 is a front elevation of the machine, omitting the wrapper-table.
Figure 2:
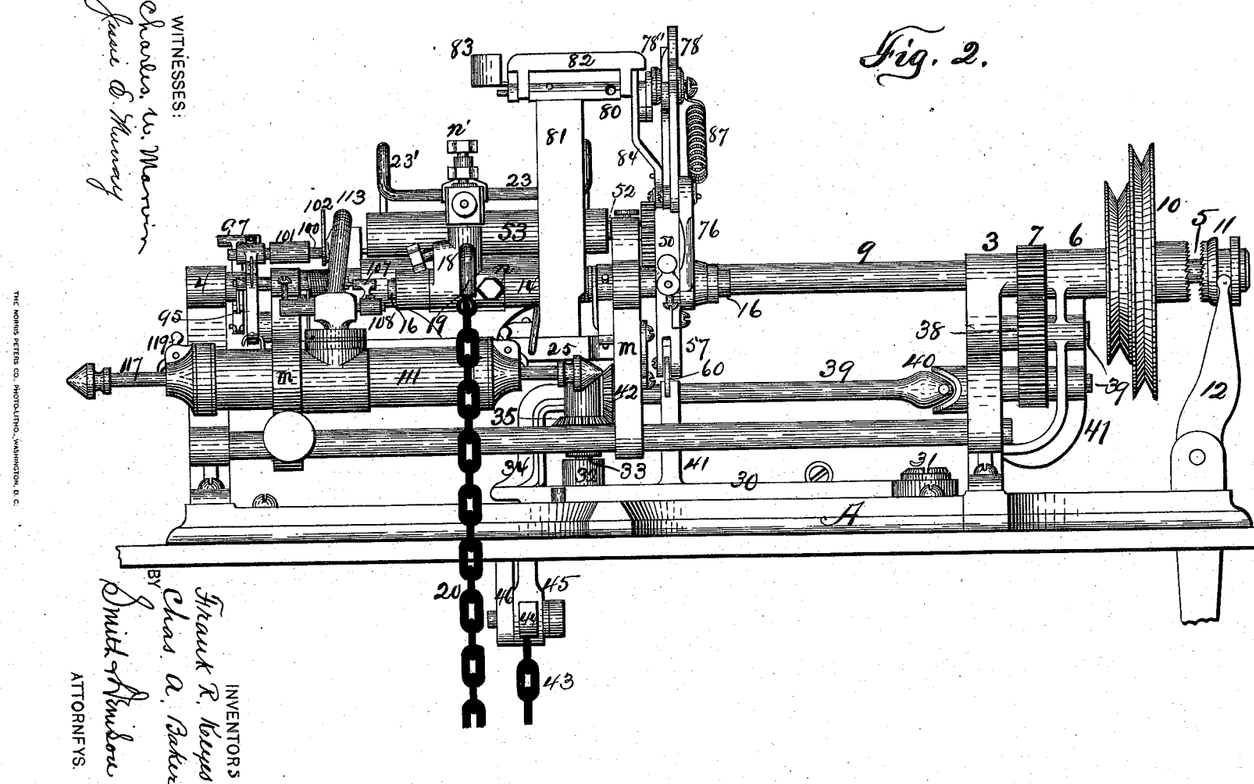
Fig. 2 is a rear elevation thereof.
Figure 3:
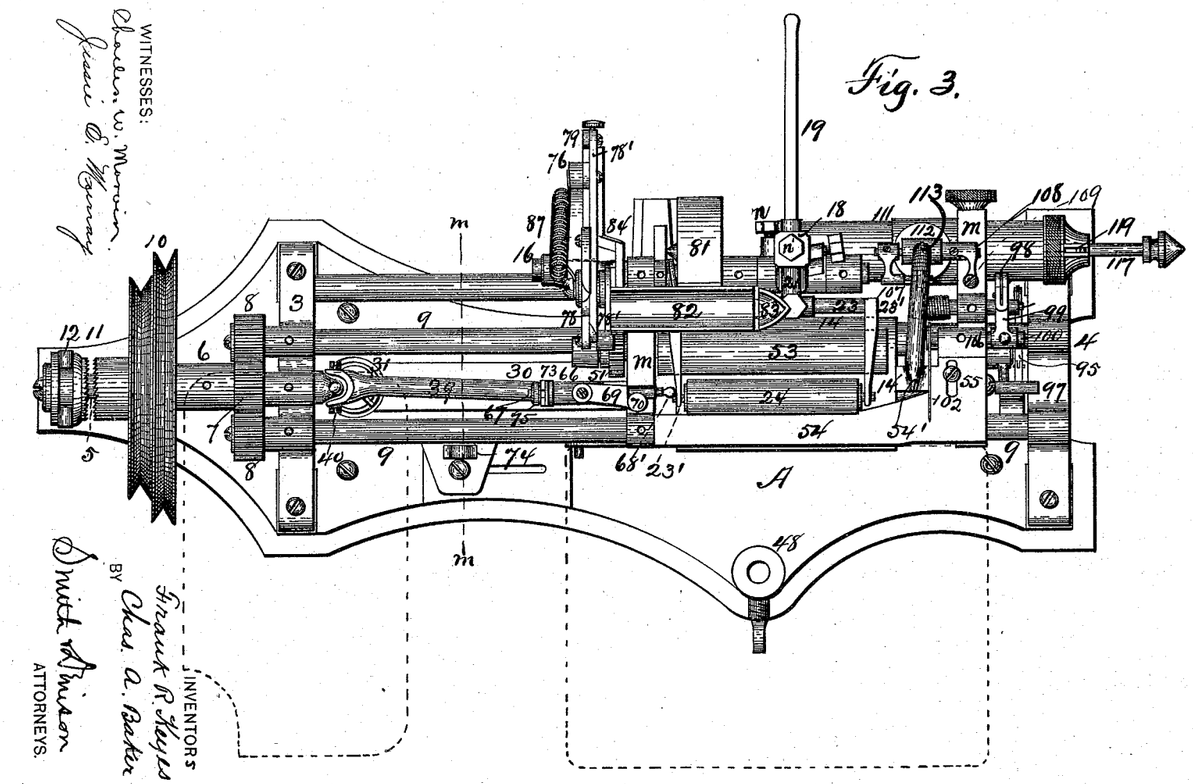
Fig. 3 is a top plan thereof, showing the wrapper-table in dotted lines, and also by dotted lines a table upon which the supply of wrappers is laid.
Figure 14:
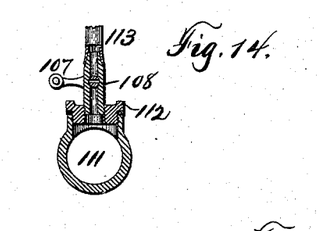
Fig. 14 is a vertical transverse section of said reservoir, pipe, and valve.
Figure 15:
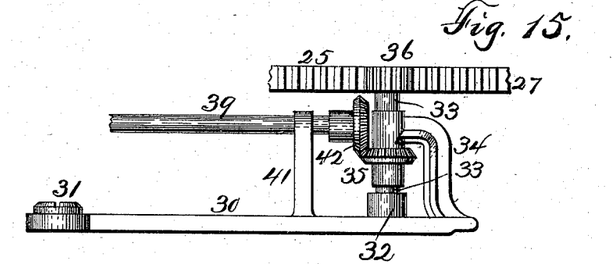
Fig. 15 is a detail in elevation of part of the driving rack-bar and its driving mechanism.
Figure 16:
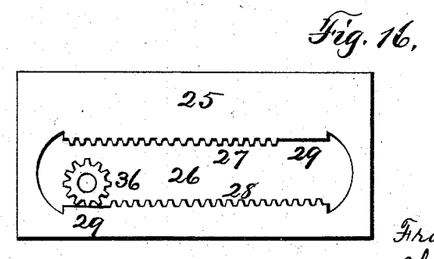
Fig. 16 is a top plan of the double rack-bar.
Figure 17:
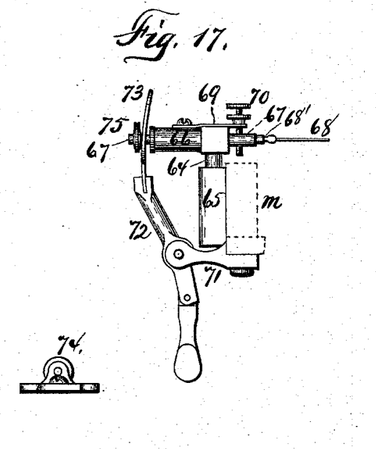
Fig. 17 is a front elevation of the wrapper-holding finger mechanism and tripper, showing the finger projected.

A lever 95 is pivoted upon a bar $m$ and provided at its outer end with a shoulder 96, with which the handle 97 engages when swung forward, said handle being pivoted upon said lever. The rear end of said lever extends backward and upward and is connected by the link 98 to a crank-arm 99 upon the rock-shaft 100, journaled in a bearing 101, Fig. 3, and 102 is the nicking-knife, secured upon and oscillated vertically by said handle to nick the wrapper, being operated by the finger of the operator. After the wrapper is nicked the operator pushes said handle back, as shown by the dotted lines in Fig. 11, and this through the rod 103, connecting the handle to the crank 104 on the rock-shaft 105, journaled at 106, and provided on its other end with another crank, (dotted lines, Fig. 3,) which is in sliding engagement with a crank 107 on the valve-shaft 108, provided with a port, substantially as shown in Fig. 14 or 30, and whereby said valve-shaft is rocked to open and close the valve-port a distance regulated by a screw-pin 109, Fig. 12, the point of which will strike the bar $m$. This valve-shaft is journaled in the valve-body 110, interiorly connected to the interior of the reservoir 111 through the plug 112, screwed into a seat upon the reservoir, and a pipe 113 connects the valve to the nipple 114 and to the conduit 115, Fig. 25.

Figure 13:
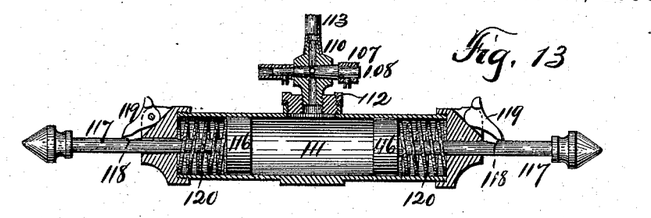
Fig. 13 is a vertical sectional elevation of the paste-reservoir, the paste-compressing devices, and the paste-discharge pipe and valve.

Pistons 116 are mounted in the reservoir upon rods 117, provided with notches 118, with which the dogs 119 engage when the pistons are drawn outward to hold them out against the tension of the springs 120 while the reservoir is being filled with paste, and when released, as shown in Fig. 13, the springs compress the paste between them, and when the valve is open eject the paste through the conduit onto the cigar-tip in proper position to be used for sticking the wrapper onto the tip. A spring 121, connected to a lever 95 and to the bar $m$, retracts both the parts of the nicking or pasting mechanism whenever either is operated and closes the valve when the pressure is removed from the handle. As the wrapper is rolled around the tip of the bunch it is drawn into and through the notch $r$, and the lap is thereby smoothed out or unfolded, so that the tip is smooth.

Having described our invention, what we claim, and desire to secure by Letters Patent, is—

1. In a cigar-machine the combination with a paste-reservoir, its discharge-pipe, an intermediate rocking valve, and a cigar-bunch-tip concavity into which the discharge-pipe opens to eject paste onto the tip of said bunch as it is being rolled into the wrapper, of a rocking handle operatively connected to said valve to open it when rocked in one direction and an oscillatory wrapper-nicking knife connected to said handle and adapted to be operated by it when it is rocked in the opposite direction.

2. In a cigar-machine, the combination with suitable cigar-bunch supporting and rotating mechanism, of a wrapper-gripping finger and suitable means to reciprocate it vertically and longitudinally.

3. In a cigar-bunch machine, the combination with a presser-roller and its frame and means to operate it vertically, of a wrapper-gripping finger and mechanism connected to the presser-roller frame whereby said finger is reciprocated vertically.

4. In a cigar-machine, the combination with a presser-roller and its frame, and means to operate it vertically, of a vertically-reciprocated wrapper-gripping finger, and means to reciprocate it longitudinally to project or retract it.

5. In a cigar-machine, the combination with suitable cigar-bunch supporting and rotating mechanism, and a traversing table carrying it, of a wrapper-gripping finger mounted in vertical and horizontal supports and means to reciprocate it vertically and longitudinally.

6. In a cigar-machine, the combination with suitable cigar-bunch supporting and rotating mechanism, a presser-roller and means to vertically reciprocate it, and a traversing table carrying them, of a wrapper-finger mounted in a horizontal support; a horizontal support mounted in a vertical support, and means to reciprocate said finger vertically and longitudinally.

7. A trough, weighted to tilt upon its support, in combination with a rock-shaft; an arm secured thereto; crossed tuck-cutting blades pivoted upon said support; links connecting them to said arm and a support engaging with said trough to right it when said blades are open, and to permit it to tilt when said arm is operated to close said blades to cut a tuck and remove said support.

In witness whereof we have hereunto set our hands on this 8th day of March, 1895.

FRANK R. KEYES.
CHARLES A. BAKER.

In presence of—
GEORGE SCOTT,
H. D. HINMAN.